(12) United States Patent
Waldhauser et al.

(10) Patent No.: US 8,434,419 B2
(45) Date of Patent: May 7, 2013

(54) ROLLER REEFING BOOM FOR SAILING SHIPS

(76) Inventors: Kurt Waldhauser, Stattegg (AT); Volker Waldhauser, Gratkorn (AT)

( * ) Notice: Subject to any disclaimer, the term of this patent is extended or adjusted under 35 U.S.C. 154(b) by 433 days.

(21) Appl. No.: 12/668,451

(22) PCT Filed: Jul. 3, 2008

(86) PCT No.: PCT/AT2008/000241
§ 371 (c)(1), (2), (4) Date: Jun. 11, 2010

(87) PCT Pub. No.: WO2009/006658
PCT Pub. Date: Jan. 15, 2009

(65) Prior Publication Data
US 2011/0168073 A1    Jul. 14, 2011

(30) Foreign Application Priority Data
Jul. 10, 2007   (AT) ................. A 1070/2007

(51) Int. Cl.
*B63H 9/10* (2006.01)
(52) U.S. Cl.
USPC .................................................. 114/7
(58) Field of Classification Search .......... 114/89, 114/106, 107
See application file for complete search history.

(56) References Cited

U.S. PATENT DOCUMENTS

| 3,310,017 A | 3/1967 | Dyer |
| 3,867,894 A | 2/1975 | Vicard |
| 4,116,152 A | 9/1978 | Larsson |
| 4,261,276 A | 4/1981 | Darzinskis |
| 4,733,624 A | 3/1988 | Belvedere |
| 5,640,919 A * | 6/1997 | Huisman ........................ 114/106 |
| 6,371,037 B1 | 4/2002 | Cook et al. |

FOREIGN PATENT DOCUMENTS

| DE | 3823838 A1 * | 2/1989 |
| SU | 1512858 | 10/1989 |

* cited by examiner

*Primary Examiner* — Edwin Swinehart
(74) *Attorney, Agent, or Firm* — Greer, Burns & Crain Ltd.

(57) ABSTRACT

The invention relates to a roller reefing boom (1 in FIG. 1) for a boom sail set with sail battens, preferably a mainsail (6), of a ship (2) with a partially enclosing sail stowage space (27) of aluminum or Faserplast, in which a largely planar sail (6) can be reefed or stowed by rolling it up, wherein the trimming of the sail (6) in all reefing states is achieved by the roll reefing boom (1) comprising a number of segments (11, 12, 14) which can be swung away horizontally in relation to one another, making the sail (6) that is guided by them adjustable variably according to the strength of the wind by means of internal control devices (37 and 76) with fixed profile characteristics (23 a and 23 b) in the depth of the profile (24).

18 Claims, 4 Drawing Sheets

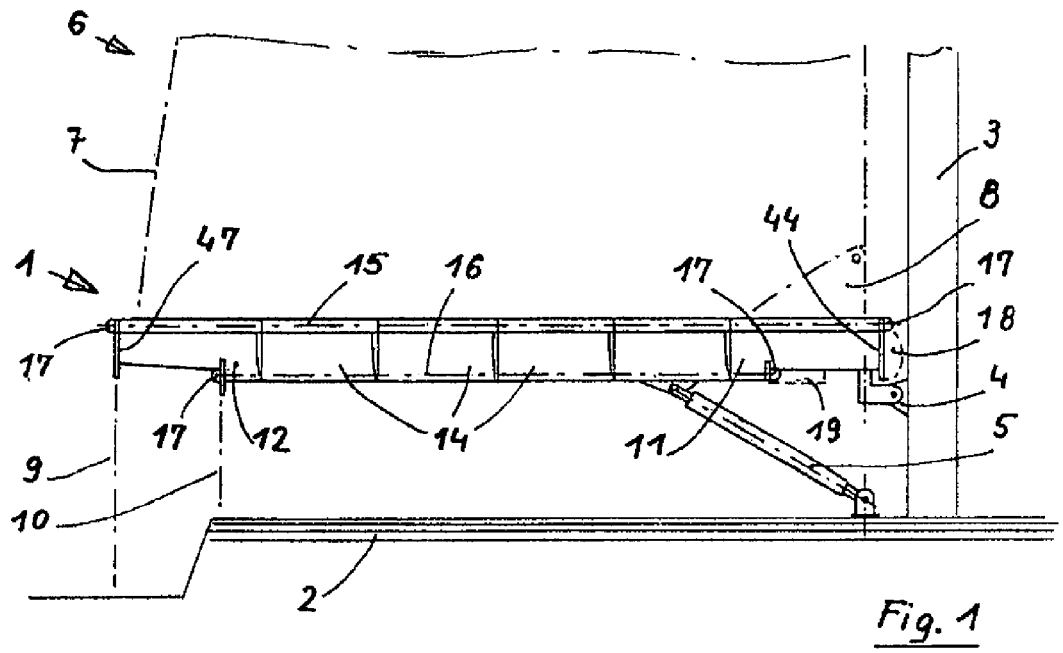
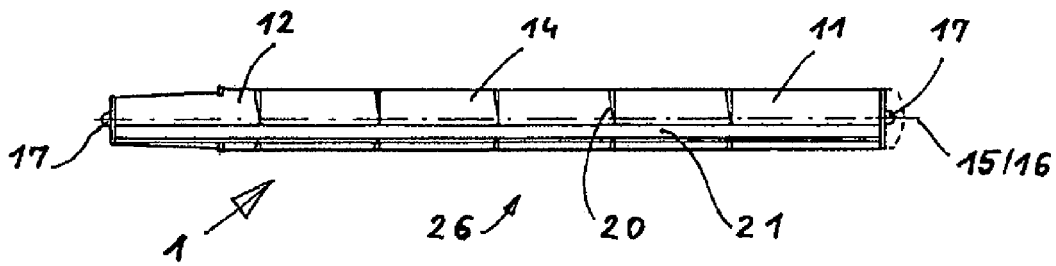
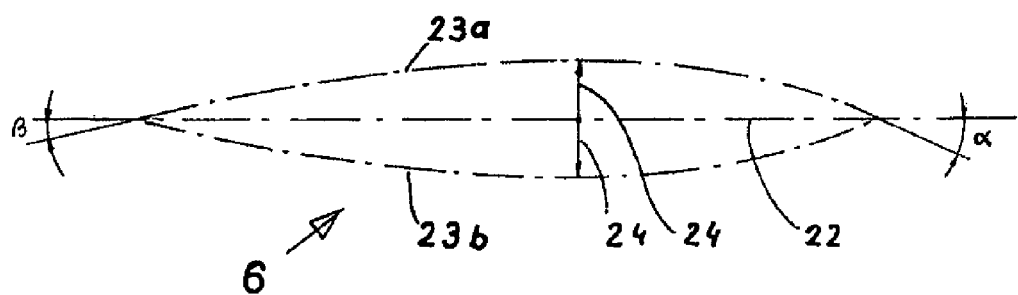

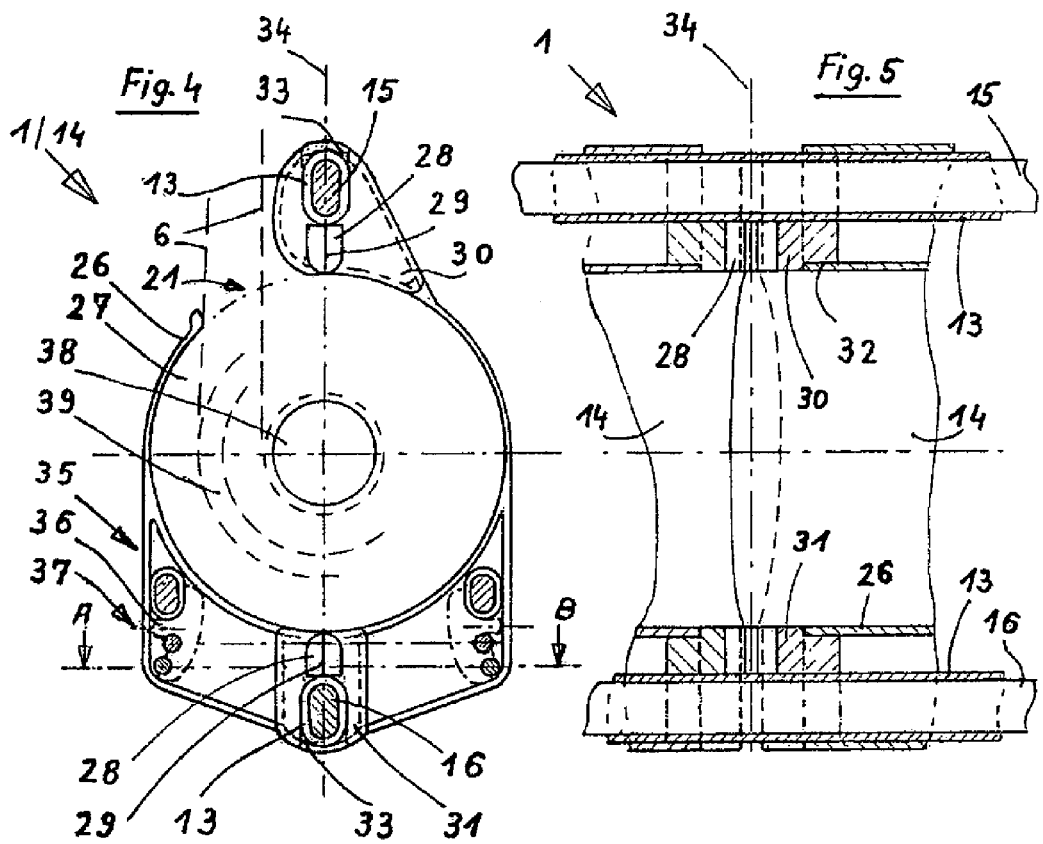
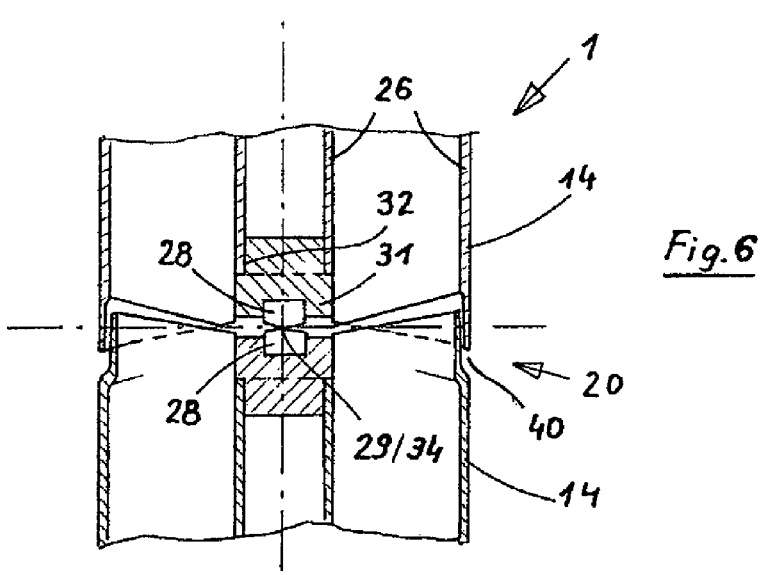

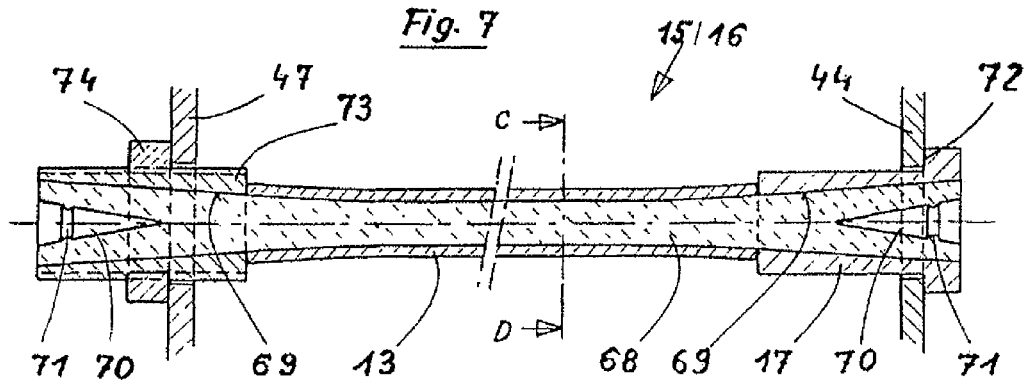
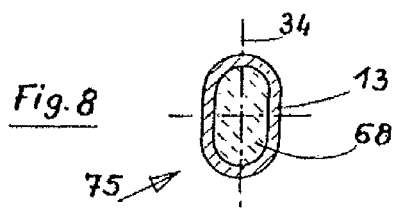
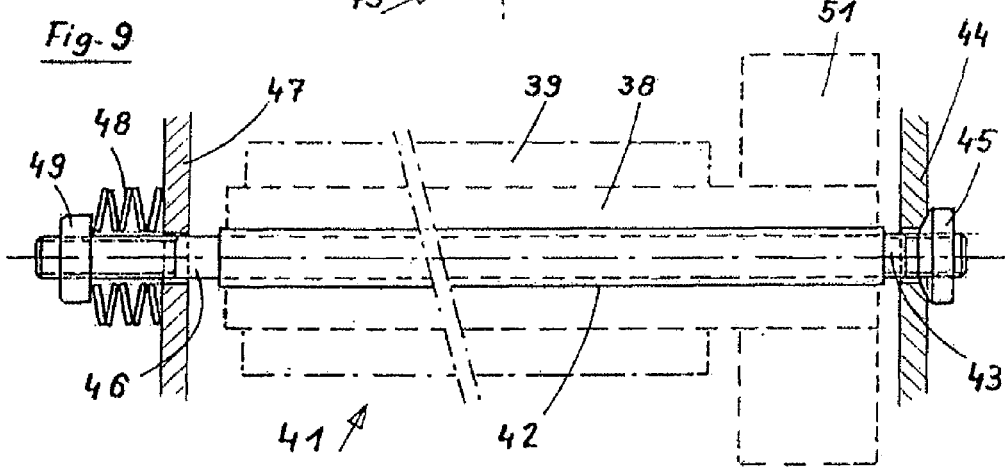
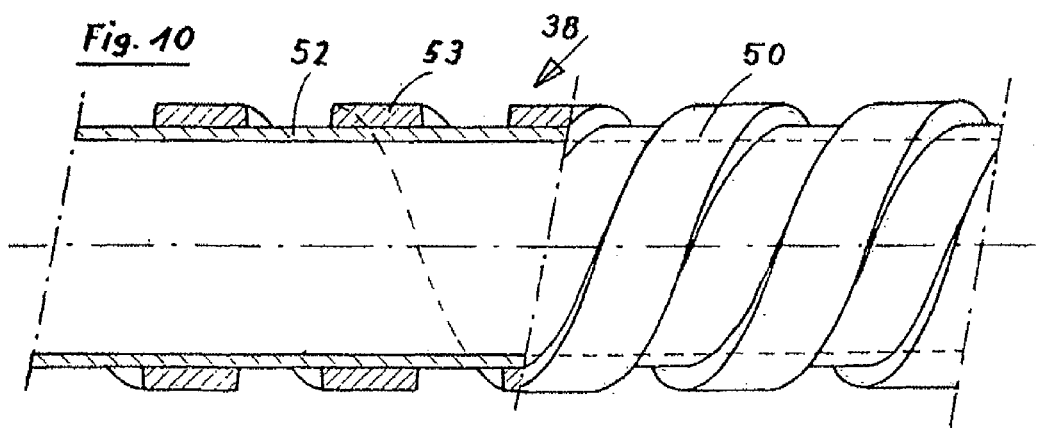

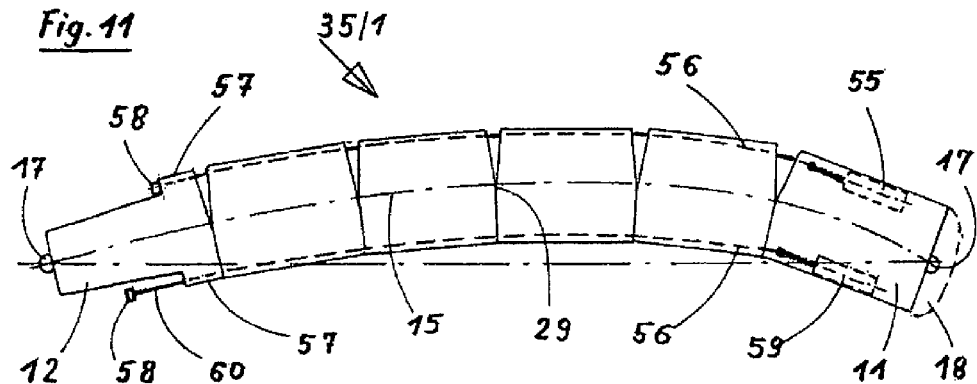
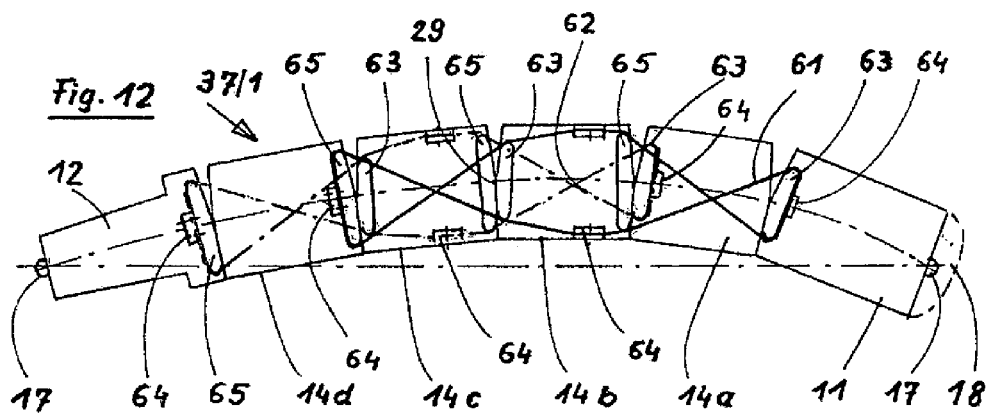
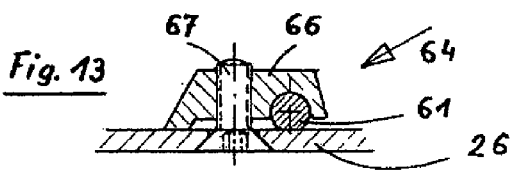
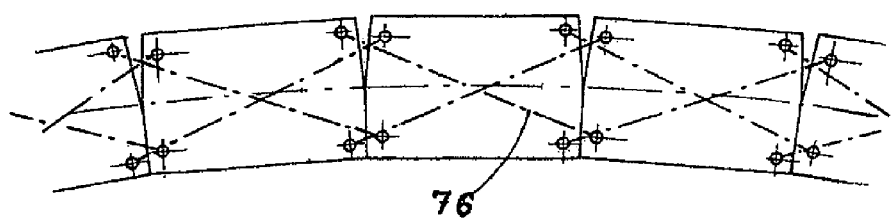

ROLLER REEFING BOOM FOR SAILING SHIPS

The invention relates to a roller reefing boom comprising of a plurality of segments which are tiltable relative to one another in the horizontal plane and enclose a substantially circular fractional sail stowage space in the longitudinal direction.

BACKGROUND OF THE INVENTION

Conventional sail booms, in particular mainsail booms, are designed straight, the sail being either guided and held in a jag with the entire under leech or held with a free under leech only on the mast side and at the boom yardarm. In order to obtain a flow-advantageous profile adapted to the wind, use is made of sails which are shaped from a broad range of materials so as to bulge three-dimensionally and are stiffened with preferably horizontal, but also with vertical sail battens, which are shaped in a broad range of manners, in such a way as to allow the rear setting of the sail to be increased in size as much as possible and as a result a larger sail area and thus a larger area exposed to the wind to be achieved in relation to the length of the fore leech and under leech.

As conventional manual sail reefing or stowing requires, above all in relatively large vessels, the exertion of a high degree of force, recent decades have seen a transition to mechanically rolling up the sails either into a hollow mast or into the hollow boom. This has the drawback that three-dimensionally profiled, bulging, i.e. aerodynamically advantageously cut, sails cannot be rolled up correctly on account of the partially different cloth lengths to be rolled up and, in the reefed, i.e. partly rolled-up, state, lose shape and have a poor position and thus poor sailing properties.

Flat-cut sails, such as are used as a remedy for roller reefing booms, also with horizontal sail battens which can be jointly rolled up, have, as a result of the straight under leech and on account of the flatness, an aerodynamically disadvantageous shape and thus, again, poorer sailing properties, above all in weak wind, where sails profiled in a bulging manner are necessary.

In recent decades, a number of developments have been proposed in order to improve the drawbacks of the poor position of the sail and thus the poor sailing properties.

These are exclusively improvements of the sail position of conventional manually reefable sails (jiffy reef) by devices which improve the curvature of the under leech in relation to a straight sail boom. For example "Boisson FR 2472508 and FR 2557064" in which the sail boom, along with the setting device according to the invention, disadvantageously has to be rotated through 180° during each tack, such as for example also in "Palmblad DE 371790".

Further examples of evaluation of the prior art include: Darzinskis U.S. Pat. No. 4,261,276, Vicard FR 2199722, Larsson CH 615631. None of these cases solves existing sail position problems which occur in roller reefing installations and for which a solution will be provided hereinafter.

SUMMARY OF THE INVENTION

The aim of the invention was to provide a largely automatable boom sail roller reefing installation, for example for a mainsail, which can be operated by hand via cable pulls, such as is conventional for relatively small vessels, or, for relatively large vessels, can be operated electrically or hydraulically from the control position allowing secure positioning and stowing of a batten boom sail which is set so as to have any desired width and both has, in weak wind, a low aerodynamically optimum profile over the entire length of the sail, so as to be completely unfurled from top to bottom, and allows, in increasing wind strength, in the reefed state a desired reduction of the profile depth with the same profile characteristics, but trimmed more flatly.

In order also to bring the entire sail area of a batten mainsail to an optimally possible drive power at all heights, it must also be possible to form an optimised, predetermined sail profile which is effective over the entire area, right down to the bottom.

A sail which can be rolled up, along with the battens, in a fold-free manner and without losing shape can be fabricated in a planar manner only over the entire reefing region with battens parallel to the winding mandrel. Above the reefing region, roughly halfway up the sail, there may be a gradual transition to a weak incorporated sail profile in the top region. In practice, this region is no longer reefed; instead, the entire sail is stowed.

In order to transfer the necessary predetermined sail profile, along with the adjustability of depth, to the sail, the entire roller reefing boom is constructed lengthwise from a plurality of segments which are horizontally tiltable relative to one another in both directions and assume the profile characteristics in a mechanically controlled manner, wherein the profile depth is continuously mechanically adjustable, depending on the prevailing wind strength, from 0 to maximum, and must in each case at the same time be able to be set for both sides, as this is necessary when tacking against the wind.

After each tack, the prefixed boom profile automatically changes over, as a result of the wind pressure, into the mirror-inverted profile along with the instantaneously set profile depth, so that similar trimming conditions prevail on the new bow as before the tack.

As stated, the roller reefing boom comprises a plurality of specially embodied segment parts which each enclose in a largely tubular manner a fraction of the sail stowage space, a head segment on the gooseneck side, a yardarm segment at the trailing end and a plurality of similar center segments therebetween.

All the segments are provided at their mutual contact points preferably with carbide-tipped tilting bearings, the vertical tilt axes of which pass through the center of the sail stowage spaces.

At the top and at the bottom point of the roller reefing segments, said roller reefing segments are advantageously provided, in an interspersing manner in the longitudinal direction, with an upper and a lower prestressed resiliently sheathed tension strand which are fastened to the head segment and to the yardarm segment respectively and form the mechanical cohesion of the roller reefing installation, allow horizontal deflecting of the segment parts toward both sides, but ensure the necessary flexural rigidity in the vertical plane.

Both the head segment and the yardarm segment are end-delimited at their outer ends by a shaped closure plate which serve as a bearing shield for a round tension rod which is preferably prestressed with plate springs and passes through the center of the sail stowage spaces of all the segment parts in the straight-set position.

Located above this stressed tension rod, which preferably comprises a thin flexible high-grade steel tube, is, in a rotatably bearing-mounted manner, a winding mandrel for rolling up the batten mainsail, the bearings of which, as they are tension-relieved, can rotate in a smooth-running manner; this is crucial for relatively small hand-operated roller reefing installations. In this way, a possible hydraulic or electric drive requires less power and weight; this is very important on a sailing vessel.

On the one hand, the winding mandrel must allow the necessary curves of the sail profile in a horizontally flexible manner; on the other hand, it must transmit the torque of the winding drive from one side over the entire length in such a way as to allow the fore leech and the after leech to be rolled up as much at the same time as possible. In addition, a certain amount of tightly rolled-up sailcloth, such as the respective reefing process requires, i.e. the reefed, rolled-up bale, should allow a correspondingly reduced profiling.

From weak wind up to a wind strength having a Beaufort number of about four, full-sail breeze generally prevails in unreefed sails. The profile depth of the batten mainsail varies in this case from deep depth at weak wind to markedly flattened. Depending on the tenderness of the vessel, the profile depth must be retracted and the sail area reduced as the wind progressively freshens. That is to say, the thicker the reefed-away sail bale is, the less profiling, or no profiling, is necessary.

However, in order to be able to sufficiently contort a winding mandrel, along with a few wound-up sailcloth layers having only low resilient stretchability, while exerting little force, the surface of the winding mandrel is advantageously provided with spiral-shaped clearances allowing both slight unconstricted stretching at the outer side and compressing with yielding crease formation on the bending inner side of the curved sailcloth layers.

The winding mandrel according to the invention is externally equipped with a preferably two to three-start threaded spiral with a trapezoidal thread-like cross section which has roughly the same surface fraction of clear intermediate spaces as at the carrying surface of the threaded bodies.

These threaded body spirals are preferably made of low-stretch fiber reinforced plastic and attached in an adhesive-connected manner via a suitably sized carrier tube made of flexible wound, but pressure-resistant fiber reinforced plastic in the form of said threaded spirals, wherein the fraction by weight of the carrier tube and attached material of the thread turns can also be about 50%.

The resistance to be achieved of the carrier tube to compressing and the low stretchability of the homogeneously connected thread loops result in a winding mandrel which has sufficiently good flexibility but is torsionally rigid and displays all the aforementioned properties.

In order to be able to monitor and to control the profiling of the roller reefing boom, two different mechanical means are provided:

The presettable positive control of the profile characteristics based on aerodynamic findings which permanently remain in the installation as a basic setting and the means to be operated for adjusting the profile depth.

The optimum profile depth of the sail is set, depending on the wind strength, by a straight setting means which preferably comprises two electrically operated small geared motors which each drive a threaded spindle which, in turn, each retract or extend a resilient tension strand which is made of preferably glass fiber-reinforced plastic and to which they are mechanically connected.

The tension strands are each located, in the longitudinal direction within the outer wall, just below the sail stowage space on both sides of the roller reefing boom segments and are arranged in a longitudinally displaceable manner within a resilient protective casing.

If, for example, the roller reefing boom deflects to one side via its pivot bearings, the curve inner length of all the segments is shortened, whereas the outer lengths are lengthened by the same degree. The free trailing end of the tension strands has a respective thickened end stop with which it protrudes from a mounting eye of the yardarm section in the case of the inner curve, but does not have to slip through and be tensioned in the case of the outer curve.

If both straight-set strands are now pulled on simultaneously and also to the same degree by means of the threaded spindle motors, then the boom is precisely centered between the strands. Equally, loosening one strand while at the same time pulling on the other would cause a corresponding boom deflection.

Partly or completely opening the tension strand paths to the same degree gives the roller reefing boom a highly specific freedom of movement and allows the roller reefing boom to newly assume after a tack the same, already adjusted profile on the other bow; this is advantageous when tacking against the wind and saves unnecessary adjustment work.

The positive control, on the other hand, is a necessary means according to the invention of the roller reefing boom for controlling the deflecting of its partial segments at all times at the same preset ratio to one another in such a way that a precalculable optimised aerodynamic curve course of the sail guided thereby must necessarily be assumed, irrespective of what profile depth was set on account of the instantaneous wind strength.

The mutual controlling of the deflection movements can be carried out, in a possible embodiment, by connecting rods which articulate the partial segments to one another at ratios according to the invention or, in the preferred embodiment, by means of flexible tension strands.

Preferably, the positive control is carried out by means of two prestressed flexible stainless steel cables which, fixed in the type of connection according to the invention between the partial segments in clamping holders, define the angles of deflection of the partial segments relative to one another at predetermined ratios.

The cable pulls must run directly under the tubular sail stowage space, as each partial segment is in pulling connection to the next-but-one partial segment of the roller reefing boom by crossed cable strands and thus forces every other segment into the corresponding curve position via the tilting bearings which absorb the corresponding counterpressure.

The members located therebetween are positively controlled in a similar manner using a second cable, said second cable passing straight, fixed by means of suitable clamping holders, through the segments with the crossed cables at the inner side of the outer wall, whereas the first cable passes similarly straight through the cable crossings of the second cable and is fixed there.

Aerodynamically optimised curve characteristics can be defined by means of the different cable distances, which purposefully deviate from the average, of controlling and controlled partial segments, by increasing or reducing the size and of the tiltings resulting therefrom.

During the final fitting in production, both control cables are inserted into the mounts provided and all the clamping holders are fixed in a prestressed manner with the boom positioned straight. From now, the roller reefing boom cannot accidentally assume any incorrect deflection, including not under the action of non-uniform force. If a partial segment is partially tilted in relation to the adjacent partial segment, then the entire roller reefing boom assumes the characteristic curve shape corresponding to the tilting for the sail; this increases operational safety and greatly simplifies operation, so that even untrained sailors have no difficulty in successfully managing a large vessel.

The above description represents in fairly broad terms the more important features of the present disclosure, so that the following detailed description contains additional features of the disclosure and is as a result more readily comprehensible.

The embodiments of the disclosure are not restricted to the details of the designs arranged in the following description and the illustrated drawings. Within the scope of the invention, it is also possible for other embodiments to be implemented and carried out in various ways. It also goes without saying that the phraseology and terminology used is used only for the purposes of description and not as a restriction.

Exemplary embodiments of the invention will be commented on hereinafter in greater detail with reference to the drawings.

BRIEF DESCRIPTION OF THE DRAWINGS

FIG. 1 is a side view of an embodiment of a roller reefing boom according to the invention in a use position on a vessel.

FIG. 2 is a plan view onto the roller reefing boom.

FIG. 3 shows two profilings, which are mirror-inverted in accordance with the invention, of the associated sail.

FIG. 4 is a cross section through a roller reefing boom in the tilting region according to the invention.

FIG. 5 is a side view in section through the vertical tilt plane in the region of the tilting bearings according to the invention.

FIG. 6 is a plan view in section "C-C" onto the tilting bearing connection according to the invention.

FIG. 7 is a plan view onto the narrow side of the tension strand according to the invention along with the incorporated end terminals.

FIG. 8 is the cross section C-D from FIG. 7.

FIG. 9 is a shortened illustration of the tension spindle.

FIG. 10 is a partial section and a spatial illustration of the winding mandrel.

FIG. 11 is a schematic plan view of a straight setting means according to the invention.

FIG. 12 is a schematic illustration of the positive control means according to the invention.

FIG. 13 shows a possible embodiment of a clamping means.

FIG. 14 shows a possible embodiment of a positive control with connecting rods.

DETAILED DESCRIPTION OF THE PREFERRED EMBODIMENT

FIG. 1 is a side view of a roller reefing boom (1) according to the invention in a possible use position on a vessel (2) after a mast (3) to which it is connected by a gooseneck (4) so as to be deflectable on all sides and is held by a boom support (5) in a substantially horizontal position and at approx. 90° to the mast (3) in order to allow the sail (6) to be unrolled and rolled up.

Shown above the roller reefing boom (1) is an indicated sail (6) which has, when rolled out, an illustrated possible after leech position (7) and, when rolled in, a sail head (8). Also shown are a possible position of a mainsheet (9) and also a second (10) as an alternative, transferring the sail pull upward to the vessel. The roller reefing boom (1) comprises a plurality of partial segments: the head segment (11), the yardarm segment (12) and a plurality of similar center segments (14) therebetween all forming segment housings (26).

Illustrated by dot/dash lines is the central position of the upper tension strand (15) and also that of the somewhat shorter lower tension strand (16) which, on account of their prestressing force, produce sufficient mechanical strength in the vertical direction; also illustrated are the screwable end terminals (17) thereof as a mechanical fixing to the head segment (11) and also to the yardarm segment (12). Indicated by dotted lines is the spatial position of a possible drive unit (18) which is attached to the head segment (11) and is preferably equipped with an electric drive with a manual emergency drive in the event of a power failure and with which the sail (6) is arranged so as to be able to be rolled in and out. Also indicated by dotted lines is a possible position of the straight setting drive (19) which is also electrically operated.

FIG. 2 is a plan view onto the roller reefing boom (1). Shown are the center line of the roller reefing boom (1), which is identical to the tension strands (15 and 16), and also the end terminals (17), furthermore the joints (20) between the head segment (11), the center segments (14) and the yardarm segment (12) which have, on account of their angle of mutual deflection, overlap regions of the segment housings (26).

The upwardly open slot-shaped outlet opening (21), through which the sail (6) can be raised out of the mast (3) and to the mast (3) by means of the main halyard (not shown) which is fastened to the sail head (8).

FIG. 3 shows possible profilings of a sail (6) which is guided by deflecting a roller reefing boom (1) which can be deflected in relation to the illustrated center line (22) by the same distance on both sides. The sail profile curve (23a) has its greatest profile depth (24) somewhat ahead of the central position viewed in the direction of travel, so that the curvature of the sailcloth decreases toward the after leech (7 in FIG. 1). According to the invention, at the same profile depth, the sail profile curve (23 b) is mirror-inverted in relation to the sail profile curve (23 a).

In interplay with an optimisable inflow angle alpha and a specific smaller outflow angle beta, it is possible to achieve an aerodynamically optimisable sail profile which is preserved in its mechanically prefixed parameters at all possible adjustable profile depths (24).

FIG. 4 is a cross section through a roller reefing installation (1) through a tilting edge plane between two adjacent intermediate segments (14) which, for production reasons, are all designed to be the same. Shown is a possible shaping of the segment housing (26) which tubularly encloses the substantially circular sail stowage space (27) apart from the asymmetrical outlet opening (21).

Located above and below the sail stowage space (27), precisely in the vertical center plane, are the pressure bearing positions which each have a tilting bearing insert (28) which is shaped in accordance with the invention and made preferably of carbide, the rounded longitudinal-side tilting edges (29) of which are arranged at a 90° angle relative to the longitudinal axis of the roller reefing boom (1) in the vertical plane, and has a clearance of the segment housings (26) within the shaped joints (20 in FIGS. 2 and 6) allowing deflection of about 5-8°.

For the distribution of pressure, each tilting bearing insert (28) is sunk into an upper pressure piece (30) and a lower pressure piece (31). The pressure pieces are preferably pressure diecast from hardenable aluminium; they are adapted to the outer shape of the segment housing (26) and also inwardly spatially delimited by the sail stowage space (27) and are centered by centering attachments (32—in FIG. 5) engaging with the wall of the segment housing (26).

The outwardly open recess (33) of each pressure piece (30) allows fitting with the upper tension strand (15), which in turn has thickened ends, by lateral sliding-on and also centers said upper tension strand in the tilting edge line (34), as a result of which all of the segment housings (26) are positioned along the tension strand (15).

Furthermore, the similarly constructed lower pressure piece (31) is delimited by the downwardly extended outer shape of the segment housing (26), which outer shape in turn encloses tension strands for the straight setting means (35), and also the stainless steel cables, for example, which are held at the longitudinal side position by internal clamping holders (36), of the positive control (37) and run under the sail stowage space (27) so as to intersect with prestress.

The outlet opening (21) of the sail stowage space (27) is advantageously arranged eccentrically of the roller reefing boom (1), so that a sail (26), which is wound up via a winding mandrel (38) rotating substantially at the center of the sail stowage space (27), can be drawn through upward in as frictionless a manner as possible even as the diameter of the sail bale (39) increases.

FIG. 5 is a side view in section of a roller reefing boom according to the invention in the region of the tilting edge line (34). Shown are the tension strands running through all the segments of the roller reefing boom (1), the upper tension strand (15) and the lower tension strand (16). In order to avoid peak stresses in the bending points, they preferably have a UV-proof rubber-like sheathing (13) and are prestressed with approximately 20-30% of their elongation at break during final fitting.

The arrangement according to the invention, which is set at maximum vertical distance by the sail stowage space (27), of very high-strength pressure and tension elements ordered in a concentrated manner one above another, which as a result produce increased flexural rigidity in the vertical direction, allows desired reductions in weight while increasing safety in relation to conventional products. The tensile forces of the prestressed tension strands (15 and 16) are intercepted in a concentrated manner in the vertical plane of the tilting edge lines (34) by the shaped carbide tilting bearing inserts (28), transferred to the pressure pieces (30 and 31) and introduced into the segment housing (26) distributed over a large area.

FIG. 6 shows the section taken along the line A-B in FIG. 4 through the lower pressure piece (31) revealing a clearance on both sides of the rounded tilting edges (29) in the tilting edge line (34) of the tilting bearing insert (28) and also the embedding thereof into the lower pressure piece (31) which is in turn supported and centered in the segment housing (26) by means of centering attachments (32).

In order to avoid injuries when handling the roller reefing boom (1), its movable joints (20) are covered by an overlap (40), so that deliberate or accidental touching is possible without risk.

FIG. 7 is a plan view onto a preferred embodiment of the upper tension strand (15) or the lower tension strand (16) in section, comprising a unidirectional strand made of high-strength flexible fiber reinforced plastic (68) of predetermined length that is surrounded by a sheathing (13) made of UV-proof rubber-like material.

The strand made of fiber reinforced plastic (68) passes through the full thickness of a shaped end terminal (17), preferably made of high-grade steel, having at the narrowest point of the conical contact surface (69) the smallest diameter which allows during production the retracting of the fiber reinforced plastic strand (68), which is preimpregnated with resin, of predefined thickness.

The increase in size of the cross section of the contact surface (69) toward the outer end is largely compensated for by the externally inserted mating cone (70) of similar volume displacement, so that the terminal (17) can no longer be withdrawn outward after the fiber reinforced plastic strand (68) has cured. For stationary fixing of the mating cone (70), said mating cone is provided with undercuts (71). The rotated end terminal (17) has at the outer end a protruding stop collar (72) which, at the outer end of the head station (11), can be suspended from the closure plate (44) in a force-transmitting manner.

In order to be able to prestress the tension strands (15 and 16 respectively) in accordance with the invention, the respective other end terminal is provided with a fine outer thread (73) which can be brought to an appropriate prestress by means of a stressing nut (74) which is mating bearing-mounted on the yardarm segment (12) in the yardarm-side closure plate (47). The end terminal with the fine outer thread (73) is incorporated with the fiber reinforced plastic strand (68) in the same manner as in the end terminal (17).

The complete length of the fiber reinforced plastic strand (68) between the end terminals (17 and 73) is surrounded by a rubber-like sheathing (13) made up of a preferably UV-proof fabric hose which functions in production as an expendable mold when pressing the strand (68) flat, but on the other hand ensures in the operative installation position the necessary protection against any mechanical damage and cushions partial kinking in the region of the tilting edge line (34 in FIG. 8) in the event of marked deflection of the partial segments of the roller reefing boom (1) and thus prevents peak stresses.

FIG. 8 shows the section C-D from FIG. 7 of the strand made of fiber reinforced plastic (68) in an advantageously pressed-flat cross-sectional shape which is decisive for the necessary propensity to bend according to the invention of the tension strands (15 and 16). In the installation position, all the tilting edge lines (34) pass through the cross-sectional shape (75) of the strand (68) in the longitudinal direction, so that the neutral bending fiber thereof coincides in each case, in the middle of the narrow-side cross section (75), with the tilting edge line (34) and minimises the tilting-out force for the roller reefing boom (1), such as is necessarily used in weak wind.

The transitions of the fiber reinforced plastic strand (68) from the round cross section within the conical contact surface (69 in FIG. 7) to the pressed-flat cross-sectional shape (75) take place in each case in an appropriate transition section in order to gently divert the flux of force within the fiber strand.

FIG. 9 is an illustration, shortened by break-off lines, of the tension spindle (41) comprising a preferably thin high-grade steel tube (42) having at one end a welded-in threaded journal (43) which reaches through the head-side closure plate (44) in a rotationally impeded manner and from the outside is axially fixed by a spherically shaped nut (45) so as to be able to pivot slightly on all sides.

Welded in on the longitudinally opposing side of the high-grade steel tube (42) is a longer threaded journal (46) which reaches through the yardarm-side closure plate (47) and places by means of the prestressing nut (49) a certain number of plate springs (48) under sufficient stress to center the winding mandrel (38) encircling it (illustrated by dotted lines) during reefing-in and out of the sail (6); this takes place only when the roller reefing boom (1) is set straight.

The flexible winding mandrel (38) is connected in direct connection to the head-side drive unit (51) which is jointly bearing-mounted in a smooth-running manner axially and radially on the tension spindle (41) at a plurality of spacings, the driving torque being transferred to the head-side closure plate (44) (not shown).

After the reefing-in or out in the straight-set state of the roller reefing boom (1), said roller reefing boom resumes in use a profile-imparting deflection which centers the winding mandrel (38) along with a possible wound-on sail bale (39) (illustrated by dot-dash lines) and the drive unit (51) connected thereto into an operating position which is delimited by the sail stowage space (27 in FIG. 4) and centered by the prestressed tension spindle (41).

FIG. 10 is a partial section of a possible structural construction of the winding mandrel (38) according to the invention and also a side view of a partial piece showing the preferably two-start trapezoidal thread-like surface profile (50) in a spatial view.

Illustrated are the carrier tube (52), which can be produced in the GFRP winding method so as to be sufficiently flexible and very dimensionally stable in diameter, and the threaded bodies (53) which loop round this tube and are securely connected to one another. The required torsional rigidity and preferred direction of rotation are produced as a result of the high tensile strength of the flat-wound loops of the threaded bodies (53) over the largely incompressible diameter of the carrier tube (52). The direction of rotation of the strain is therefore advantageously to be adhered to in such a way that the looping threaded body (53) is tensioned and the carrier tube (52) is compressed.

FIG. 11 is a schematic plan view of a straight setting means (35) according to the invention of a roller reefing boom (1) which has assumed by means of its partial segments, which can be deflected via the tilt axes (29), a possible curve course in, for example, the greatest possible deflection.

Illustrated are, stationarily connected to the head segment (11), a small geared electric motor (55) with a fully extended threaded spindle, to the end of which is fixedly connected a flexible sheathed tension strand (56) of the straight setting means (35), which tension strand is held within the segment housings (26 in FIG. 4) by internal clamping holders (36 in FIG. 4) so as to be longitudinally displaceable in the outer curve (illustrated by dotted lines) within the roller reefing boom (1).

The flexible tension strand (56) passes through a mounting eye (57) which is stationarily present at the adjoining end of the yardarm segment (12) on both sides and ends therewith an end terminal (58), which is fixed to the tension strand (56), as the end stop. The small geared motor (59), which is located at the shortened inner side, drives a similarly mirror-inverted arrangement of the aforementioned components so that, when the tension spindle is extended, the flexible tension strand (56) is longitudinally displaced within the segment housing (26 in FIG. 4) and the differential length of both tension strands (56) in the curve course causes, as the controllable stroke (60), the flexible tension strand (56) to protrude from the mounting eye (57) of the yardarm segment (12).

When both spindles of the small geared motors (55 and 59) are extended to full length, the roller reefing boom (1) can be fully deflected in both horizontal directions; this takes place as a result of the wind pressure of the sail (6).

Before each reefing process, the threaded spindles of both small geared motors (55 and 59) are equally shortened in the electrically interconnected state until both tension strands (56) are at the same tension and the roller reefing boom (1) is centered and set straight.

A possible adjustment of the straight position or the deliberate setting of a one-sided profile can take place by electrically isolated individual switching of the small geared motor (55), for example on extension, and of the opposing small geared motor (59) on retraction.

FIG. 12 shows a preferred embodiment of a positive control (37) according to the invention in a schematic illustration as a plan view onto a roller reefing boom (1).

Shown is the outer contour of the roller reefing boom (1) which has assumed a possible positively controlled curve course via its tilt axes (29) of its, for example six shown, outwardly pivotable partial segments. The crossing course of the preferably used stainless steel cables of the positive control (37) may be seen below the sail stowage space (27 in FIG. 4).

Two separate cable strands, which are each in crossed cable connection to each next-but-one segment, are provided to force all the segments into the deflection provided relative to one another.

The first cable strand (61) is fixed midway along its length on an internal spacer small (63) of the head segment (11) by a clamping holder (64) and passes, freely stressed, through the center segment (14 *a*) in an intersecting manner with its two ends which rest stressed against the outer end of the spacer large (65) of the center segment (14 *b*) and are fixed by a clamping holder (64) within the outer wall of the center segment (14 *b*). The extended cable ends subsequently rest against the spacer small (63) and lead in further crossed form to the outer ends of the spacer large (65) of the center segment (14 *d*), where the first cable strand (61) ends fixed with prestress by means of the clamping holder (64).

The second cable strand (62—illustrated by dot-dash lines) is also fixed centrally on the spacer small (63) of the center segment (14 *a*) by a clamping holder (64); it passes, freely stressed, through the subsequent center segment (14 *b*) in crossing form and rests against the spacer large (65) of the center segment (14 *c*) in which it is also fixed by means of clamping holders (64) at each inner side of the outer wall, guided via the spacer small (63) and fixed in a prestressed manner crosswise on the spacer large (65) of the yardarm segment (12) by means of clamping holders (64). On deflection of one center segment, for example, in relation to another, all segments jointly control at a mechanically defined ratio.

The ends of the spacers small (63) that are positioned on the outside in the deflection curve control through the crossed cables in each case the ends of the spacers large (65) that are positioned in the inner curve a specific characteristic curve shape which becomes flatter as required toward the yardarm segment (12) and is in accordance with the invention preserved as being prefixed in the roller reefing boom (1). The location of the respectively greatest profile depth of all possible freely settable profile depths is thus defined; this can be adjusted as the end delimitation from zero to maximum by the straight setting means (35 in FIG. 11) depending on the wind strength. If now all the spacers large (65) of the roller reefing boom (1) are designed so as to be larger in highly specific dimensions than the spacers small (63), a curve imparting a desired profile in accordance with aerodynamic aspects can be implemented for the sail (6) in the roller reefing boom (1).

FIG. 13 shows a possible embodiment of a conventional clamping holder (64) which presses a mold plate (66), which is equipped with corresponding threads, against the inner side of the segment housing (26) and fixes the cable strand (61) positioned therebetween by means of one or more countersunk head screws (67) which reach through the segment housing (26).

FIG. 14 shows a possible embodiment of a positive control of the roller reefing boom (1) which functions in the same way but uses tensioned and compressed articulated connecting rods (76), for example, which also crossingly connect every other partial segment to one another, so that the mutual deflections in both horizontal directions are possible only in accordance with the profile characteristics, which are prefixed in a force-transmitting manner, as a result of the wind pressure of the sail (6).

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A roller reefing boom for a boom sail stiffened with sail battens, of a vessel with a partially enclosing, substantially circular sail stowage space and in which a sail can be reefed or stowed by rolling it up, the said stowage space enclosing a flexible winding mandrel therein, the roller reefing boom comprising:
   a head segment,
   a yardarm segment and
   a plurality of intermediate segments which are tiltable relative to one another in a horizontal plane and each enclose in the longitudinal direction a fractional formed sail stowage space, the head segment, the yardarm segment and the intermediate segments being arranged end to end and together comprising segment housings.

2. A roller reefing boom according to claim 1, wherein said boom sail is a mainsail.

3. A roller reefing boom according to claim 1, wherein said circular sail stowage space is made of aluminium or fiber reinforced plastic.

4. A winding mandrel made of fiber reinforced plastic for a roller reefing boom according to claim 1, wherein the winding mandrel, for roughly half its weight, comprises a flexible carrier tube which is dimensionally stable in diameter and, for roughly half its weight, comprises a looping high-strength threaded body fixedly connected to the flexible carrier tube in a surrounding fashion, the threaded body having a trapezoidal surface profile covering approximately 50% of surface area of the flexible carrier tube.

5. A winding mandrel made of fiber reinforced plastic according to claim 4, extending between a yardarm-side closure plate and a head-side closure plate, which closure plates are tiltable relative to each other, of the roller reefing boom, a round tension spindle is present, the spindle being axially fixed at one end of the head-side closure plate so as to be pivotable by means of a threaded journal of a spherically shaped nut and has at an other end an elongated threaded journal which reaches through the yardarm-side closure plate and stresses with a prestressing nut a number of plate springs positioned between the yardarm-side closure plate and the prestressing nut.

6. A roller reefing boom according to claim 5, wherein said round tension spindle comprises a thin high-grade steel tube.

7. A roller reefing boom according to claim 1, wherein the segment housings are interspersed with a positive control arrangement comprising two separate tension strands, the tension strands each being securely clamped to a side wall in at least one of the intermediate segment housings and extending in a crossing manner from one segment housing to the next, a plurality of the segment housings being provided at one end with a large internal spacer abutting a small internal spacer located on an end of an adjacent segment housing, the tension strands having a tension engagement with the large internal spacers and the small internal spacers, the tension strands each being fixed to one of the small internal spacers of a different one of the segment housings and to one of the large internal spacers of other ones of the segment housings.

8. A roller reefing boom for a boom sail stiffened with sail battens, of a vessel with a partially enclosing, substantially circular sail stowage space and in which a sail can be reefed or stowed by rolling it up, the said stowage space having a flexible winding mandrel, the roller reefing boom comprising:
   a head segment;
   a yardarm segment and
   a plurality of intermediate segments which are tiltable relative to one another in a horizontal plane and each enclose in the longitudinal direction a fractional formed sail stowage space, the head segment, the yardarm segment and the intermediate segments being arranged end to end and together comprising segment housing, wherein tension strands, which pass through center segments, guided by pressure pieces at their respective outer ends, and are fastened to the head segment and also to the yardarm segment and form in this plane a flexurally rigid cohesion, run in a prestressed manner in a vertical center plane above and below the sail stowage space of the roller reefing boom within the segment housings.

9. A roller reefing boom according to claim 8, wherein pressure-resistant tilting bearing inserts with protruding rounded tilting edges along a tilting edge line, sunk into pressure pieces in the segment housing, are stationarily mounted above and below the sail stowage space at all mutual contact points of the segment housings in the vertical center plane and clear a joint for horizontally tilting the segment housings relative to one another.

10. A roller reefing boom according to claim 9, wherein said tilting bearing inserts are made of carbide.

11. A roller reefing boom according to claim 9, wherein said pressure pieces are made of hard aluminium.

12. A roller reefing boom according to claim 9, wherein the pressure pieces have an outwardly open recess, a width and shape of which correspond to a cross-sectional shape to be received of the tension strands.

13. A roller reefing boom according to claim 8, wherein one of the tension strands has, at least in a region to be bent, a cross-sectional shape which is pressed flat and a narrow-side neutral central bending line of which runs parallel to tilting edge lines of the roller reefing boom with fluid transitions to conical contact surfaces of end terminals which are incorporated into the strand along with a mating cone, and the entire strand between the end terminals is surrounded by a sheathing.

14. A roller reefing boom according to claim 13, wherein said one of the tension strands comprises a strand which is made of fiber reinforced plastic.

15. A roller reefing boom according to claim 13, wherein said end terminals are made of high-grade steel.

16. A roller reefing boom for a boom sail stiffened with sail battens, of a vessel with a partially enclosing, substantially circular sail stowage space and in which a sail can be reefed or stowed by rolling it up, the said stowage space having a flexible winding mandrel, the roller reefing boom comprising:
   a head segment,
   a yardarm segment and
   a plurality of intermediate segments which are tiltable relative to one another in a horizontal plane and each enclose in the longitudinal direction a fractional formed sail stowage space, the head segment, the yardarm segment and the intermediate segments being arranged end to end and together comprising segment housings, wherein there are mechanically guided, substantially laterally of the sail stowage space within a housing extension downward, two flexible resiliently sheathed tension strands on opposing sides of the segments, in a longitudinally displaceable manner and so as to pass through said segments in the longitudinal direction, an installation and functional plane of which lies at a 90° angle in relation to tilting edges and ends of which tension strands can be brought under tension by means of an end terminal and tension spindles.

17. A roller reefing boom according to claim 16, wherein said tension strands are made of fiber reinforced plastic.

18. A roller reefing boom according to claim 16, wherein said tension strands are made of stainless steel cables.

* * * * *